(12) United States Patent
Tanaka et al.

(10) Patent No.: US 10,214,117 B2
(45) Date of Patent: Feb. 26, 2019

(54) CONVEYANCE SEAT

(71) Applicant: TOYOTA BOSHOKU KABUSHIKI KAISHA, Aichi (JP)

(72) Inventors: Ryusuke Tanaka, Aichi (JP); Tomokazu Fukuta, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/646,828

(22) Filed: Jul. 11, 2017

(65) Prior Publication Data

US 2018/0037138 A1 Feb. 8, 2018

(30) Foreign Application Priority Data

Aug. 5, 2016 (JP) .................................. 2016-154690

(51) Int. Cl.
| | |
|---|---|
| *B60N 2/02* | (2006.01) |
| *B60N 2/12* | (2006.01) |
| *B60N 2/68* | (2006.01) |
| *B64D 11/06* | (2006.01) |
| *B61D 33/00* | (2006.01) |
| *B63B 29/04* | (2006.01) |

(52) U.S. Cl.
CPC ........... *B60N 2/0232* (2013.01); *B60N 2/123* (2013.01); *B60N 2/682* (2013.01); *B60N 2002/024* (2013.01); *B61D 33/0078* (2013.01); *B63B 2029/043* (2013.01); *B63B 2709/00* (2013.01); *B64D 11/064* (2014.12)

(58) Field of Classification Search
CPC ...... B60N 2/0232; B60N 2/123; B60N 2/682; B60N 2002/024; B64D 11/064; B63B 2029/043; B63B 2709/00

USPC .......................................... 297/362.11, 354.1
See application file for complete search history.

(56) References Cited

U.S. PATENT DOCUMENTS

| 4,195,881 A * | 4/1980 | Kluting ................ B60N 2/0232 188/69 |
|---|---|---|
| 2012/0068506 A1* | 3/2012 | Yamaki ................ B60N 2/0232 297/216.1 |
| 2013/0300174 A1* | 11/2013 | Ito ........................ B60N 2/1615 297/354.1 |

(Continued)

FOREIGN PATENT DOCUMENTS

JP 2015-20711 2/2015

*Primary Examiner* — Mark R Wendell
(74) *Attorney, Agent, or Firm* — Greenblum & Bernstein, P.L.C.

(57) ABSTRACT

A conveyance seat is provided. The conveyance seat comprises a first side frame portion disposed in a first side of a seat width direction extending substantially in an up-down direction, a second side frame portion disposed in a second side of the seat width direction extending substantially in the up-down direction, a drive mechanism configured to generate driving force so as to pivot the first side frame portion and the second side frame portion in the front-rear direction of the seat, a walk-in mechanism disposed in an opposite side of the drive mechanism in the seat width direction across the first side frame portion, a motor fixing portion disposed on the first side frame portion and provided with a fixing surface on which the drive mechanism is secured and a bracket configured to secure the drive mechanism to the fixing surface.

7 Claims, 9 Drawing Sheets

(56) References Cited

U.S. PATENT DOCUMENTS

| | | | |
|---|---|---|---|
| 2016/0059752 A1* | 3/2016 | Kishida | F16H 57/039 |
| | | | 297/344.12 |
| 2017/0297457 A1* | 10/2017 | Murakami | B60N 2/0232 |
| 2018/0022235 A1* | 1/2018 | Sugiyama | B60N 2/0244 |
| | | | 297/284.9 |
| 2018/0208087 A1* | 7/2018 | Baba | B60N 2/68 |

* cited by examiner

CONVEYANCE SEAT

CROSS-REFERENCE TO RELATED APPLICATIONS

The present application claims the benefit of Japanese Patent Application No. 2016-154690 filed on Aug. 5, 2016 with the Japan Patent Office, the entire disclosure of which is incorporated herein by reference.

BACKGROUND

The present disclosure is related to a conveyance seat used for a conveyance including an automobile, a railroad vehicle, a ship, an airplane.

For example, a conveyance seat disclosed in Japanese Unexamined Patent Application Publication No. 2015-20711 includes a seatback that is pivotable in a front-rear direction of the seat (hereinafter, to be also referred to as reclining). In the aforementioned publication, a drive mechanism for reclining is secured to a lateral surface of a side frame.

In other words, the side frame forms a framework of the seatback and is disposed in each of a first side and a second side of a seat width direction. These two side frames each has lateral surface portions intersecting substantially perpendicularly with the seat width direction. The drive mechanism is secured to the lateral surface portion of the side frame disposed in the first side of the seat width direction.

SUMMARY

"Walk-in-slide function" is known as a function of a conveyance seat and a "walk-in mechanism" is known for achieving such function. This function enables "a seat cushion to be slidable in the front-rear direction of the seat in association with the movement of the seatback to be tilted toward the front side of the seat".

The walk-in mechanism is generally secured to a lateral surface portion of a side frame. Accordingly, in a conveyance seat provided with a walk-in mechanism, a fixing portion of a drive mechanism and a fixing portion of a walk-in mechanism in the seat width direction overlap in the aforementioned lateral surface portion and thus, the drive mechanism cannot be secured to the side frame.

It is preferable that one aspect of the present disclosure provides a conveyance seat in which a walk-in mechanism and a drive mechanism can be secured to one side frame.

One aspect of the present disclosure provides a conveyance seat. The conveyance seat comprises a seatback, a first side frame portion, a second side frame portion, a drive mechanism, a walk-in mechanism, a motor fixing portion, and a bracket. The seatback is configured to be pivotable in a front-rear direction of the seat with respect to a seat cushion. The first side frame portion is configured to form a framework of the seatback and disposed in a first side of a seat width direction extending substantially in an up-down direction. The second side frame portion is configured to form the framework of the seatback together with the first side frame portion and disposed in a second side of the seat width direction extending substantially in the up-down direction. The drive mechanism is configured to generate driving force so as to pivot the first side frame portion and the second side frame portion in the front-rear direction of the seat. The walk-in mechanism is disposed in an opposite side of the drive mechanism in the seat width direction across the first side frame portion. The motor fixing portion is disposed on the first side frame portion and provided with a fixing surface on which the drive mechanism is secured. The bracket is configured to secure the drive mechanism to the fixing surface. The drive mechanism is disposed on the first side frame portion in a side of the second side frame portion in the seat width direction. The fixing surface intersects substantially perpendicularly with a front-rear direction of the seat.

Accordingly, the walk-in mechanism is secured in the first side of the seat width direction across the first side frame portion. The drive mechanism is secured in the second side of the seat width direction across the first side frame portion and secured to the fixing surface intersecting substantially perpendicularly with the front-rear direction.

In other words, since the position to secure the drive mechanism in one aspect of the present disclosure is different from a conventional position of a drive mechanism, a conveyance seat can be achieved wherein the walk-in mechanism and the drive mechanism can be secured to the first side frame portion.

In the present disclosure, since the drive mechanism is secured to the fixing surface via the bracket, a conventional drive mechanism can be secured to the fixing surface by replacing the bracket.

The conveyance seat according to one aspect of the present disclosure may be configured as described below.

For example, the fixing surface may be disposed in a rear-end side of the first side frame portion in the front-rear direction of the seat. As a result, the fixing portion is not positioned in the back side of an occupant. This disposition can inhibit the fixing surface from giving discomfort to an occupant in a seated position.

The bracket may comprise two clamping portions configured to clamp the drive mechanism from both sides of the front-rear direction of the seat so as to support the drive mechanism, and an extending portion extending from any one of the two clamping portions toward the fixing surface. As a result, the drive mechanism can be easily supported.

The extending portion may comprise a plate portion formed substantially in a plate-shape and one of a convex-shaped or a concave-shaped bead portion provided on the plate portion. Accordingly, the flexural rigidity of the extending portion can be increased and thereby the drive mechanism can be firmly secured.

The bracket may be secured to the fixing surface with a fastening tool inserted into the bracket from a rear side of the seat. This structure enables the fastening tool, such as a screw, to be easily inserted and fastened.

The first side frame portion may comprise a first surface portion intersecting substantially perpendicularly with the seat width direction and a second surface portion intersecting substantially perpendicularly with the front-rear direction of the seat. Moreover, the motor fixing portion may be provided to the second surface portion. In other words, the first surface portion, the second surface portion, and the motor fixing portion may be integrally formed.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

Figure 1:
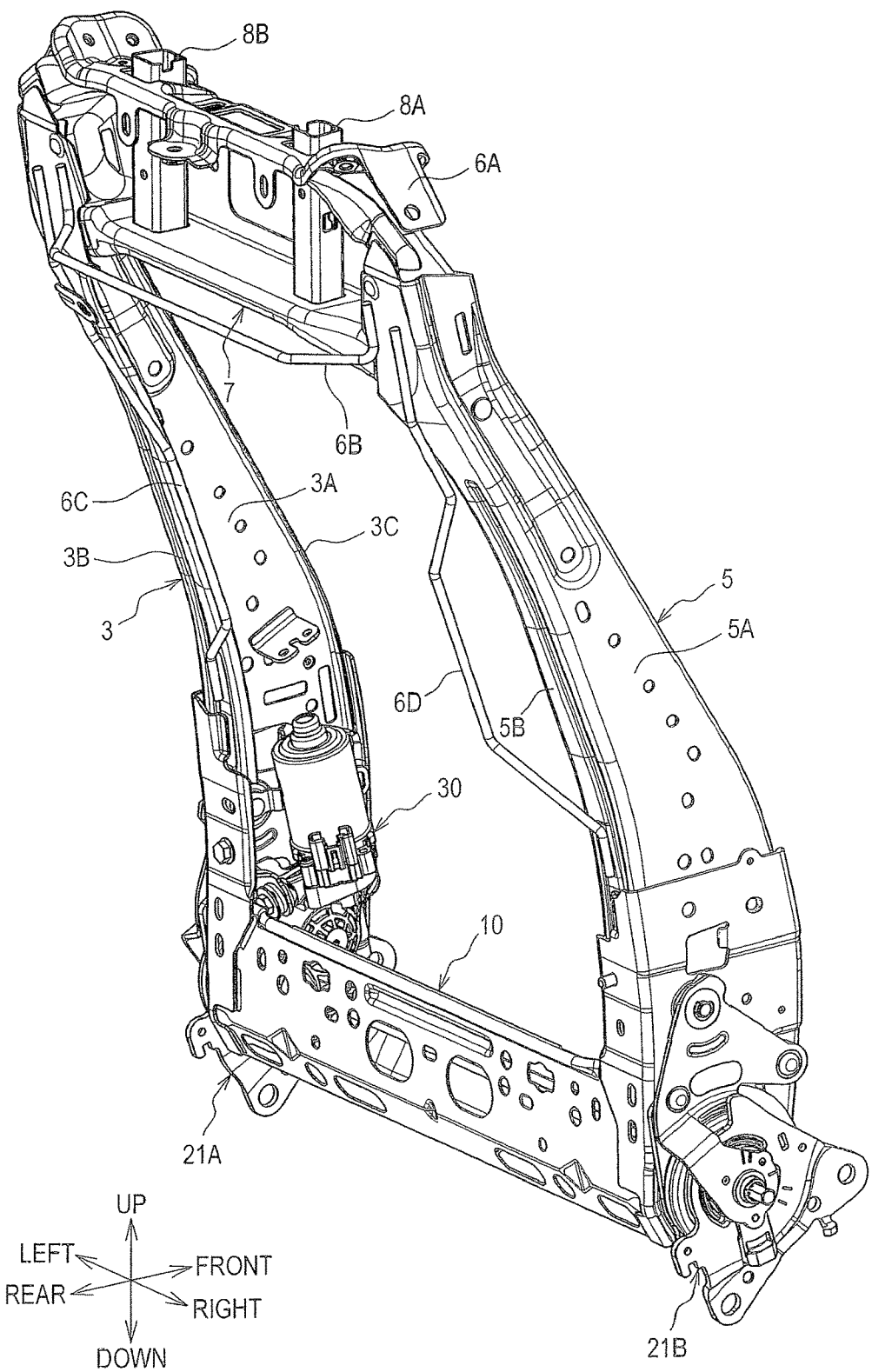
FIG. 1 is a perspective view showing a seatback frame according to a first embodiment of the present disclosure, viewed from a rear surface side of the seatback.

An "embodiment" to be described below shows one example of embodiments belonging to the technical scope of the present disclosure. That is, invention-specifying matters recited in the claims are not limited to specific configurations, structures, and so on shown in the present embodiment.

Arrows and the like on the drawings indicating directions are intended to facilitate understanding of relationships between the drawings. The arrows and the like (directions) on the drawings do not limit the scope of the present disclosure.

A member or a portion described at least with a reference numeral attached thereto is at least one in number except in the presence of indication such as "a plurality of" and "two or more".

[First Embodiment]

The present embodiment describes a seat in the second row of a minivan comprising three rows of seats, or a front passenger seat of a standard-sized passenger car. The direction in the following description is a direction of the conveyance seat according to the present embodiment installed in a conveyance.

1. Overview of Conveyance Seat

Figure 2:
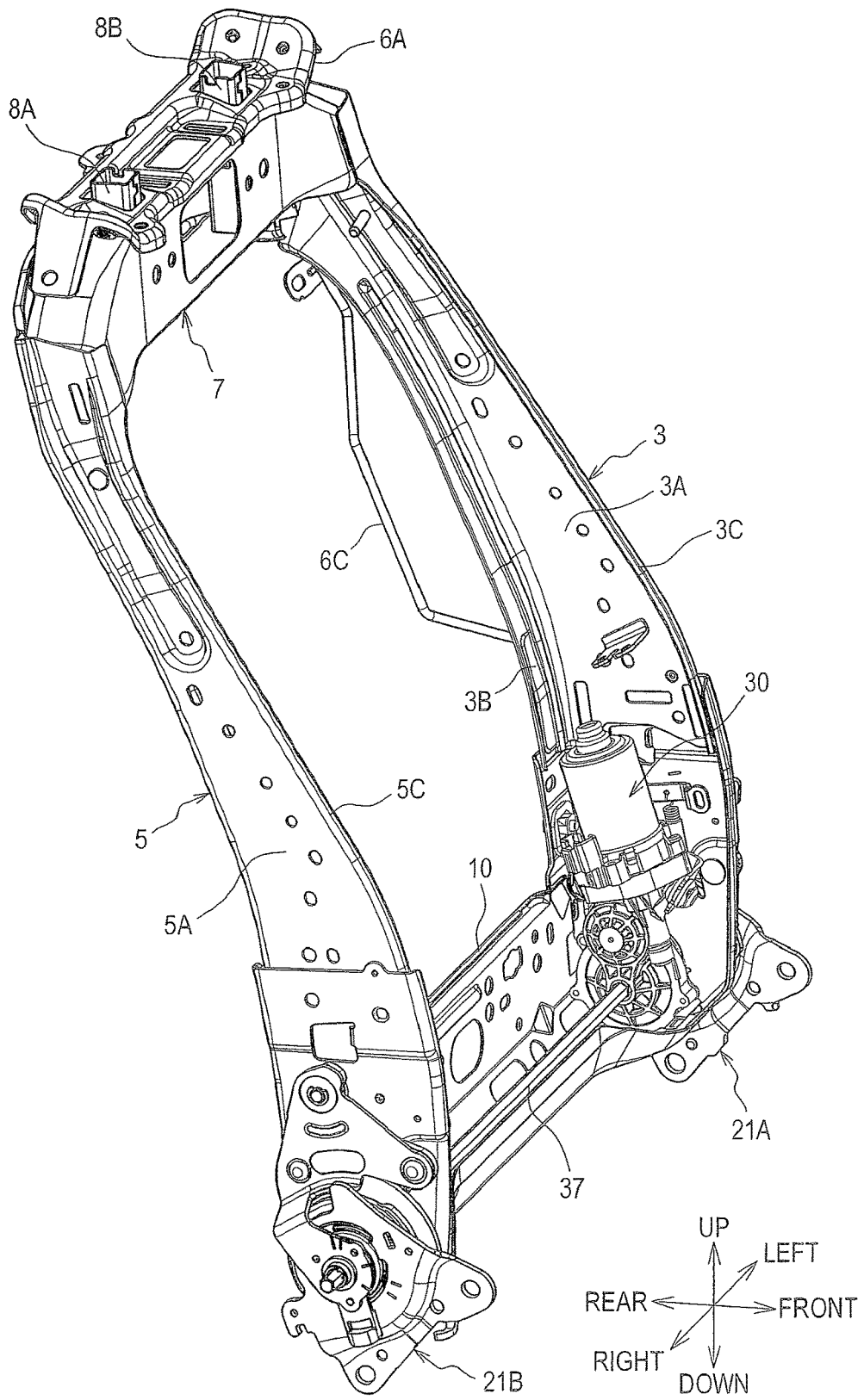
FIG. 2 is a perspective view showing the seatback frame according to the first embodiment, viewed from a front surface side of the seatback.
Figure 9:
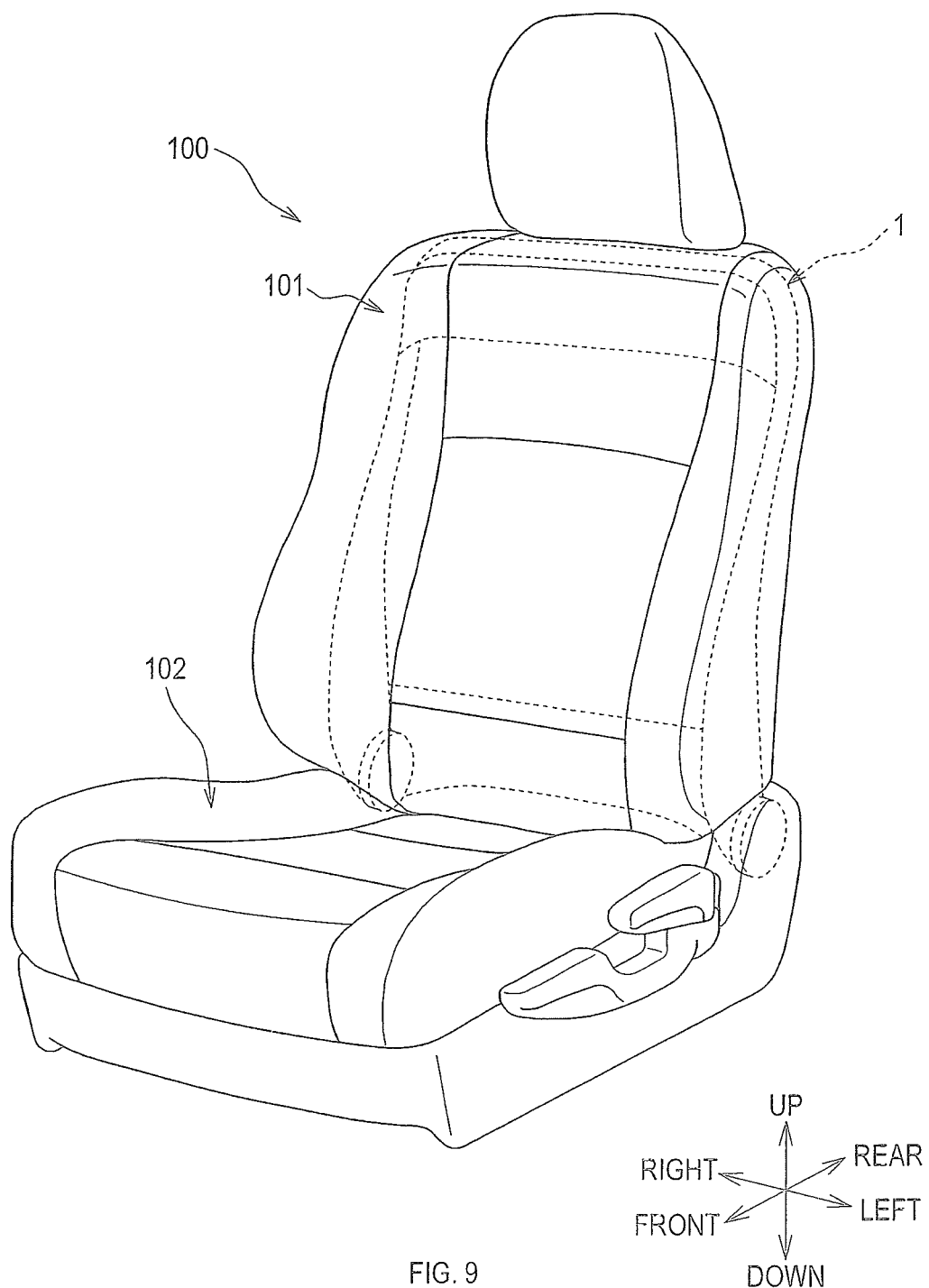
FIG. 9 is a perspective view showing a conveyance seat according to the first embodiment.

As shown in FIGS. 1 and 2, a seatback frame 1 of a conveyance seat according to the present embodiment is a panel-type seatback frame formed with a portal-shaped rigid frame structure. The seatback frame 1 forms a seatback 101 of a conveyance seat 100 shown in FIG. 9.

The seatback 101 is a backrest that supports the back of an occupant. The seatback 101 is configured to be pivotable in a front-rear direction of the seat with respect to a seat cushion 102 on which an occupant is seated. The seatback frame 1 is covered by a cushion pad portion and a cover portion of the seatback 101.

The cushion pad portion is a portion that absorbs impact force. The cushion pad portion is made of a material, for example, foamed urethane, that absorbs impact force while being deformed. The cover portion is a portion that covers the cushion pad portion. The cover portion is made of, for example, leather or synthetic leather.

Figure 3:
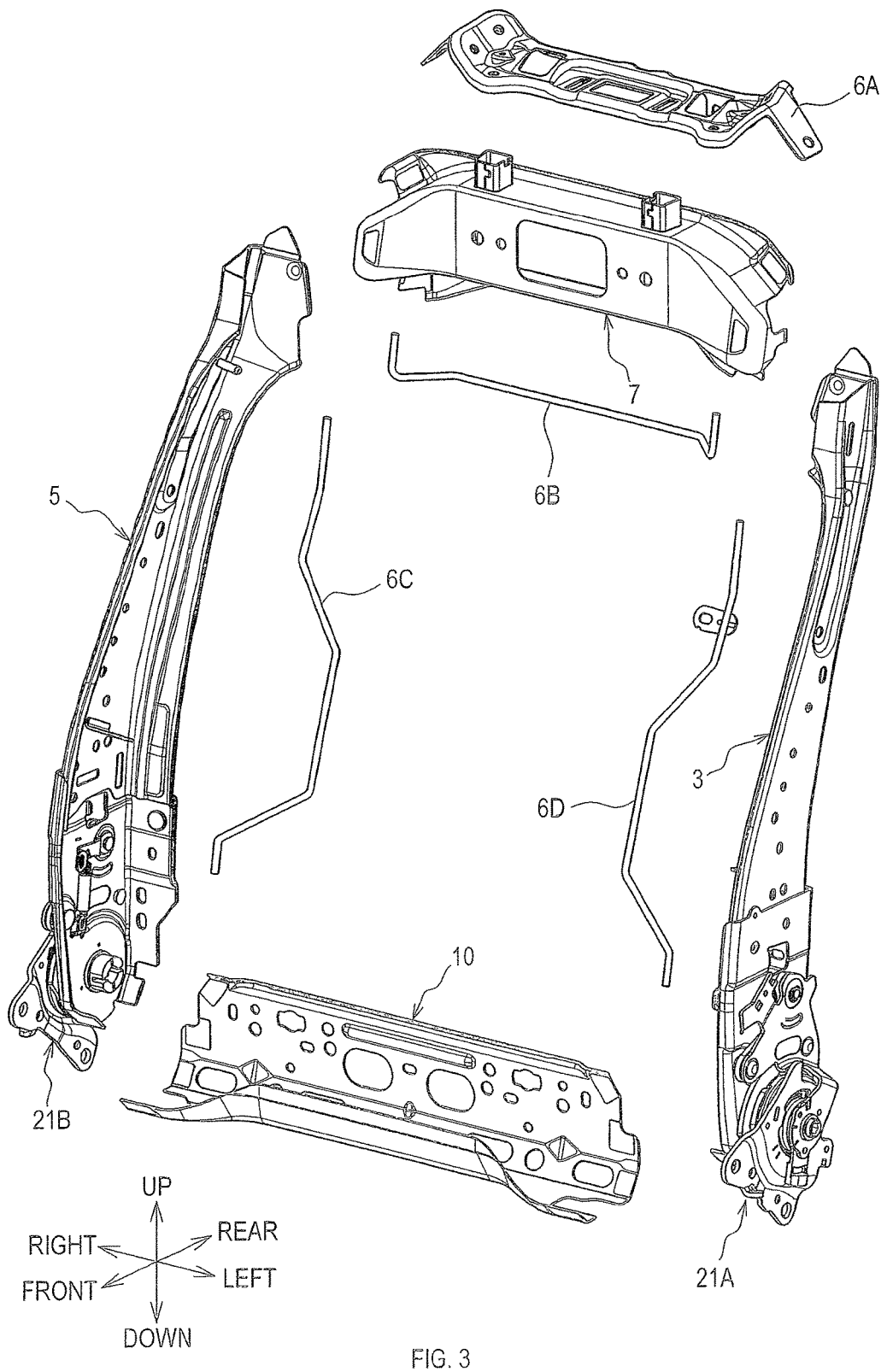
FIG. 3 is an exploded perspective view showing the seatback frame according to the first embodiment.

The seatback frame 1 comprises, as shown in FIG. 3, two side frame portions 3, 5 and an upper panel portion 7. The two side frame portions 3, 5 extend substantially in an up-down direction and are disposed facing each other in a seat width direction so as to form the framework of the seatback frame 1. The seat width direction corresponds to a left-right direction of the conveyance in the present embodiment.

Hereinafter, between the two side frame portions 3, 5, one side frame portion disposed in a first side (the left side, in the present embodiment) of the seat width direction will be referred to as a first side frame portion 3. The other side frame portion disposed in a second side (the right side, in the present embodiment) of the seat width direction will be referred to as a second side frame portion 5.

The first side frame portion 3 and the second side frame portion 5 are panel members formed substantially symmetrical to each other in the seat width direction. The cross-sections of the first and the second side frame portions 3, 5 intersecting perpendicularly with an extending direction of the first and the second side frame portions 3, 5 are open cross-sections each formed like a letter C.

Specifically, as shown in FIGS. 1 and 2, the two side frame portions 3, 5 respectively comprise lateral surface portions 3A, 5A and flange portions 3B, 3C, 5B, 5C. The lateral surface portions 3A, 5A each forms a first surface portion intersecting substantially perpendicularly with the seat width direction.

The flange portions 3B, 3C respectively extend from both ends in the width direction of the lateral surface portion 3A toward the second side frame portion 5, and form wall-like second surface portions that extend along the extending direction of the first side frame portion 3 at the both ends. The width direction of the lateral surface portions 3A, 5A corresponds to the front-rear direction of the seat.

The flange portions 5B, 5C respectively extend from both ends in the width direction of the lateral surface portion 5A toward the first side frame portion 3, and form wall-like third surfaces that extend along the extending direction of the second side frame portion 5 at the both ends.

The size of the extension of the flange portions 3B, 5B disposed at the rear end in the front-rear direction of the seat is larger than the size of the extension of the flange portions 3C, 5C disposed at the front end in the front-rear direction of the seat. The lateral surface portion 3A and the flange portions 3B, 3C are integrally formed of a metal plate. Similarly, the lateral surface portion 5A and the flange portions 5B, 5C are integrally formed of a metal plate.

The upper panel portion 7 extends in the seat width direction so as to couple the upper end of the first side frame portion 3 and the upper end of the second side frame portion 5. The upper panel portion 7 is a panel-type frame, the cross-section of which intersects perpendicularly with an extending direction of the upper panel portion 7 is an open cross-section formed like a letter C.

Figure 4:
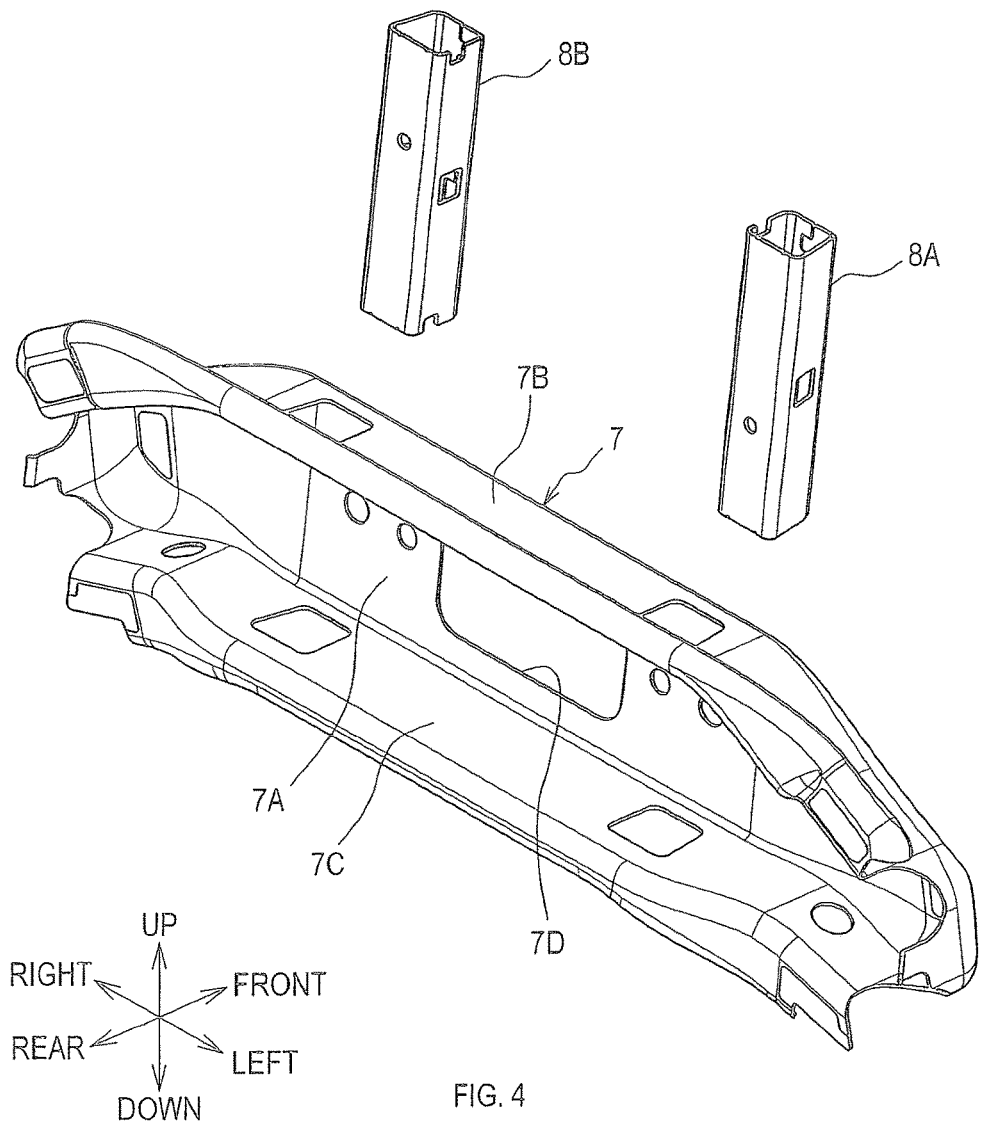
FIG. 4 is an exploded perspective showing an upper panel portion according to the first embodiment.

That is, as shown in FIG. 4, the upper panel portion 7 comprises a first surface portion 7A forming a strip-plate-like panel portion and intersecting substantially perpendicularly with the front-rear direction of the seat and two second surface portions 7B, 7C intersecting substantially perpendicularly with the up-down direction.

In the middle portion of the first surface portion 7A in the extending direction, a through-hole 7D is provided penetrating in the front-rear direction of the seat. The second surface portion 7B is a strip-plate-like projection member extending in the seat width direction, and extends toward the rear side of the seat from the upper end of the first surface portion 7A.

The second surface portion 7C is a strip-plate-like projection member extending in the seat width direction, and extends toward the rear side of the seat from the lower end of the first surface portion 7A. The first surface portion 7A and the two second surface portions 7B, 7C are integrally formed of a metal plate.

A first end of the upper panel portion 7 in the extending direction is coupled and secured to the upper end of the first side frame portion 3 by a securing method, such as welding. A second end of the upper panel portion 7 in the extending direction is coupled and secured to the upper end of the second side frame portion 5 by a securing method, such as welding.

To the upper panel portion 7, two support brackets 8A, 8B are secured. The two support brackets 8A, 8B are tubular (in the present embodiment, square tubular) members configured to support a headrest (not shown). The headrest is a member configured to support the head of an occupant.

The support brackets 8A, 8B are disposed away from each other in the seat width direction and extend substantially in the up-down direction. The support brackets 8A, 8B according to the present embodiment are each welded and secured to the two second surface portions 7B, 7C while penetrating the second surface portion 7B in the up-down direction.

As shown in FIG. 2, in the lower end side of the first side frame portion 3, a first walk-in mechanism 21A is provided. In the lower end side of the second side frame portion 5, a second walk-in mechanism 21B is provided.

The walk-in mechanisms 21A, 21B are both configured to allow the seat cushion 102 constituting a seat portion to slide in the front-rear direction of the seat in association with the movement of the seatback 101 to be tilted toward the front side of the seat.

The walk-in mechanisms 21A, 21B are both manually operated by a passenger via an operation lever (not shown). The operation lever is disposed in the upper end side of the seatback 101 in the first side of the seat width direction.

The operation of the operation lever is transmitted to the both walk-in mechanisms 21A, 21B via an operation cable, such as a control cable (not shown). The first walk-in mechanism 21A and the second walk-in mechanism 21B are thereby inter-connectedly operated.

A drive mechanism 30 is disposed in the opposite side of the first walk-in mechanism 21A in the seat width direction across the first side frame portion 3. In other words, the drive mechanism 30 is disposed on the first side frame portion 3 in the side of the second side frame portion 5, and the first walk-in mechanism 21A is disposed on the lateral surface portion 3A in the opposite side of the drive mechanism 30 across the first side frame portion 3.

The drive mechanism 30 is configured to generate driving force to pivot the first side frame portion 3 and the second side frame portion 5 in the front-rear direction of the seat (hereinafter, to be referred to as reclining driving force). The drive mechanism 30 according to the present embodiment, is a motor unit comprising, for example, a deceleration mechanism having an electric motor, a plurality of gears, and so on.

The lower ends of the first side frame portion 3 and the second side frame portion 5 are coupled by a lower panel portion 10. The lower panel portion 10 is a panel-like frame extending in the seat width direction. The lower panel portion 10 is welded in a first end side of the extending direction thereof so as to be secured to the first side frame portion 3 and welded in a second end side of the extending direction thereof so as to be secured to the second side frame portion 5.

As shown in FIG. 3, the first side frame portion 3 and the second side frame portion 5 according to the present embodiment are each configured with a panel member comprising two members integrated by welding. A first member of the two members is a lower end side member to which the walk-in mechanism 21 and the lower panel portion 10 are provided. A second member of the two members is a member disposed in the side of the upper panel portion 7. The members 6A to 6D are provided so as to achieve a multiple-attachment structure.

2. Assembled Structure of Drive Mechanism

Figure 5:
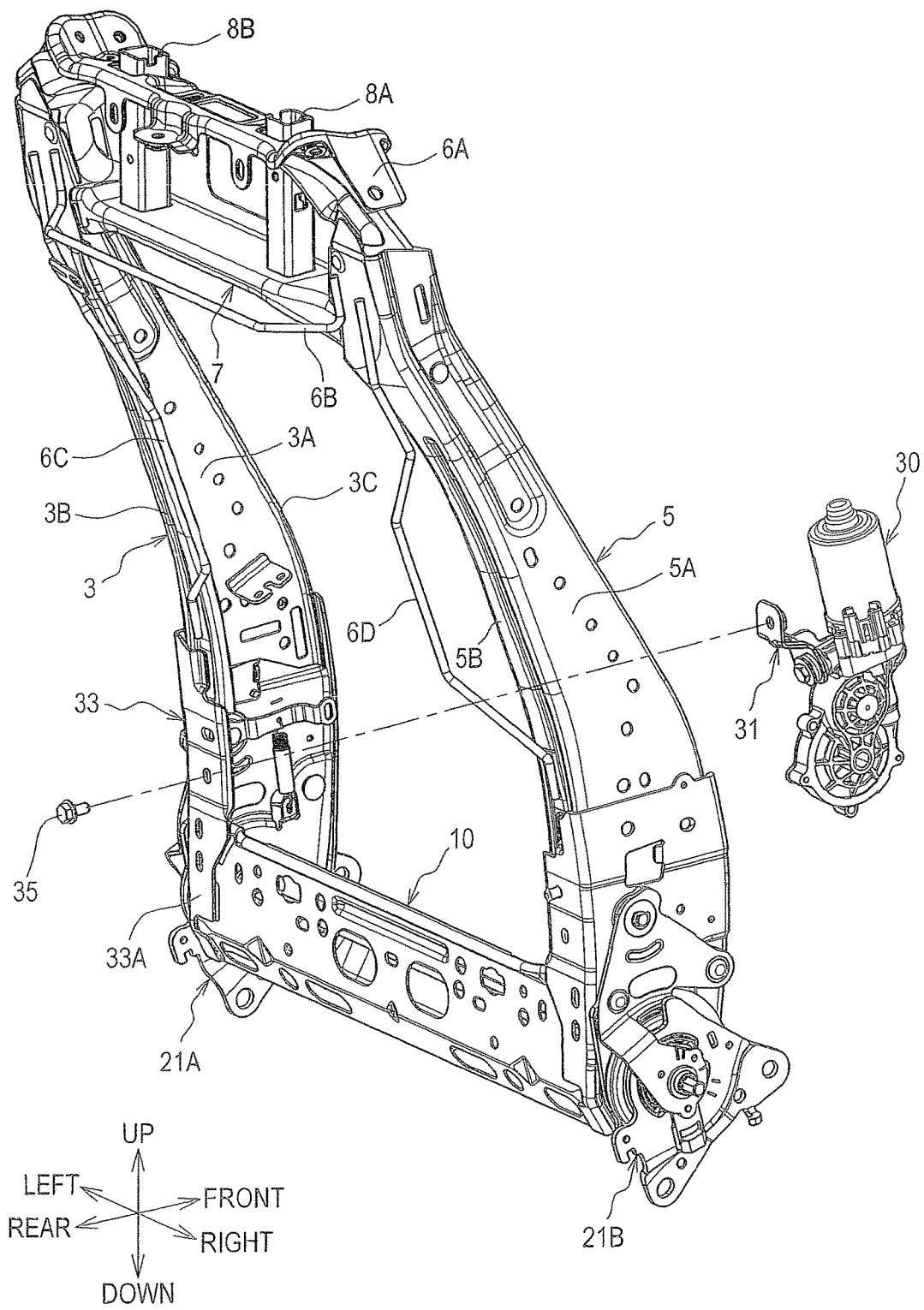
FIG. 5 is a diagram illustrating an attachment of a drive mechanism to a seatback frame according to the first embodiment.
Figure 6:
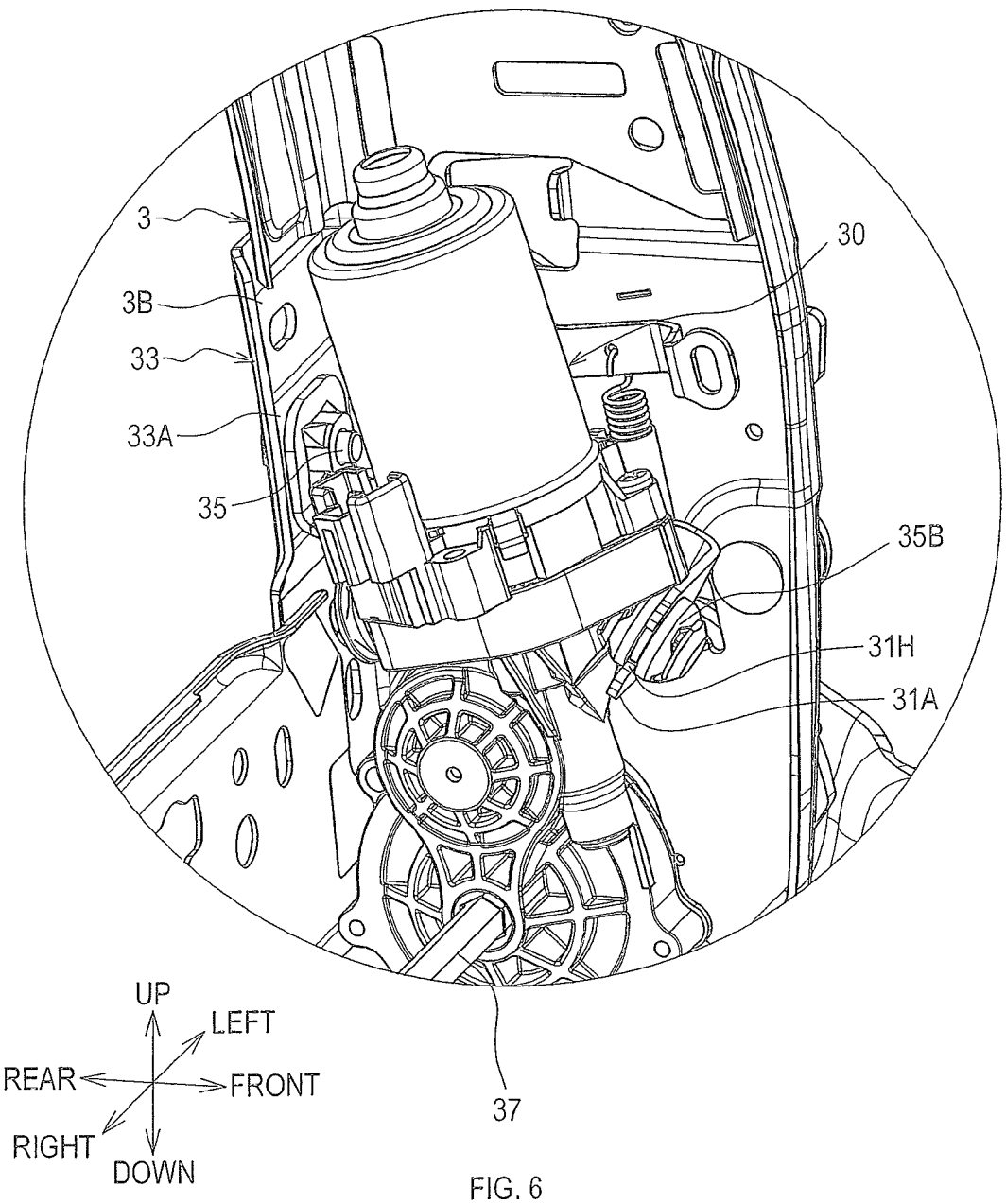
FIG. 6 is an enlarged view showing the drive mechanism in an attached state according to the first embodiment.

As shown in FIG. 5, the drive mechanism 30 is assembled with the first side frame portion 3 via a motor bracket 31. The first side frame portion 3 is provided with a motor fixing portion 33 as shown in FIG. 6 having a fixing surface 33A on which the drive mechanism 30 is secured.

The fixing surface 33A is configured with a plate surface intersecting substantially perpendicularly with the front-rear direction of the seat. The fixing surface 33A is positioned in the rear end side of the first side frame portion 3 in the front-rear direction of the seat. The motor fixing portion 33 according to the present embodiment, that is, the fixing surface 33A is disposed in the flange portion 3B of the first side frame portion 3.

In other words, the fixing surface 33A is disposed in the front side of the flange portion 3B in the seat direction. The motor bracket 31 is secured to the fixing surface 33A with a fastening tool 35, for example, a bolt, being inserted into the motor bracket 31, as shown in FIG. 5, from the rear side of the seat.

Figure 7A:
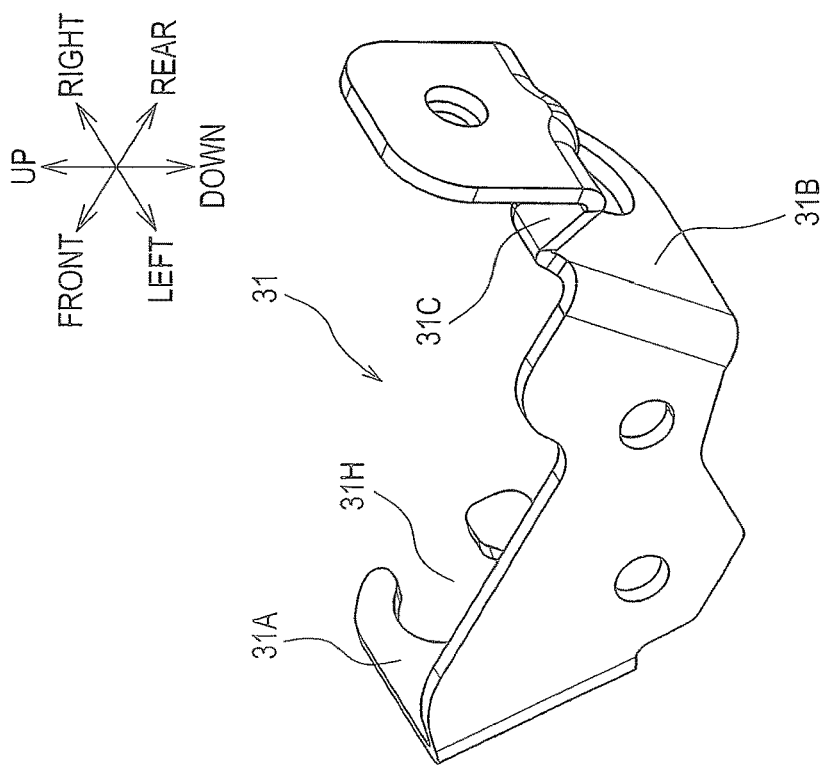
FIGS. 7A and 7B are perspective views showing a motor bracket according to the first embodiment.
Figure 7B:
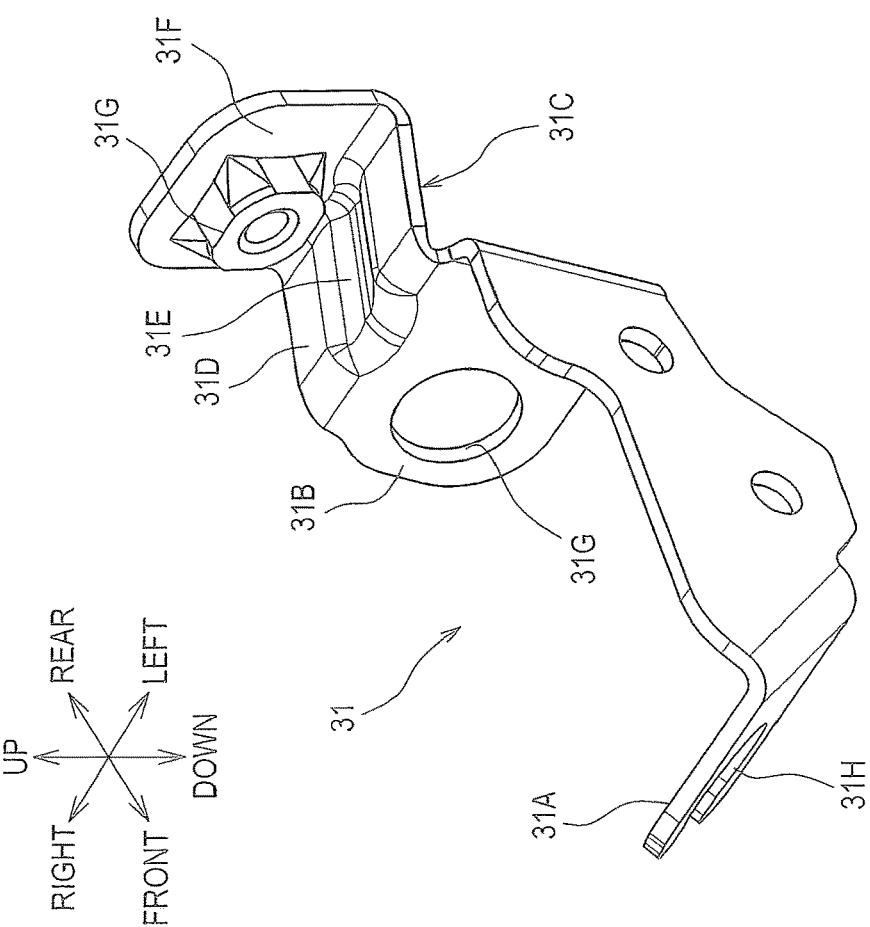

The motor bracket 31 is configured to secure the drive mechanism 30 to the fixing surface 33A. The motor bracket 31 comprises, as shown in FIGS. 7A, 7B, two clamping portions 31A, 31B and an extending portion 31C.

The two clamping portions 31A, 31B are configured to clamp the drive mechanism 30 from both sides of the front-rear direction of the seat so as to support the drive mechanism 30. The two clamping portions 31A, 31B are respectively configured with surfaces inclined with respect to the up-down direction toward each other at the lower ends thereof.

Figure 8:
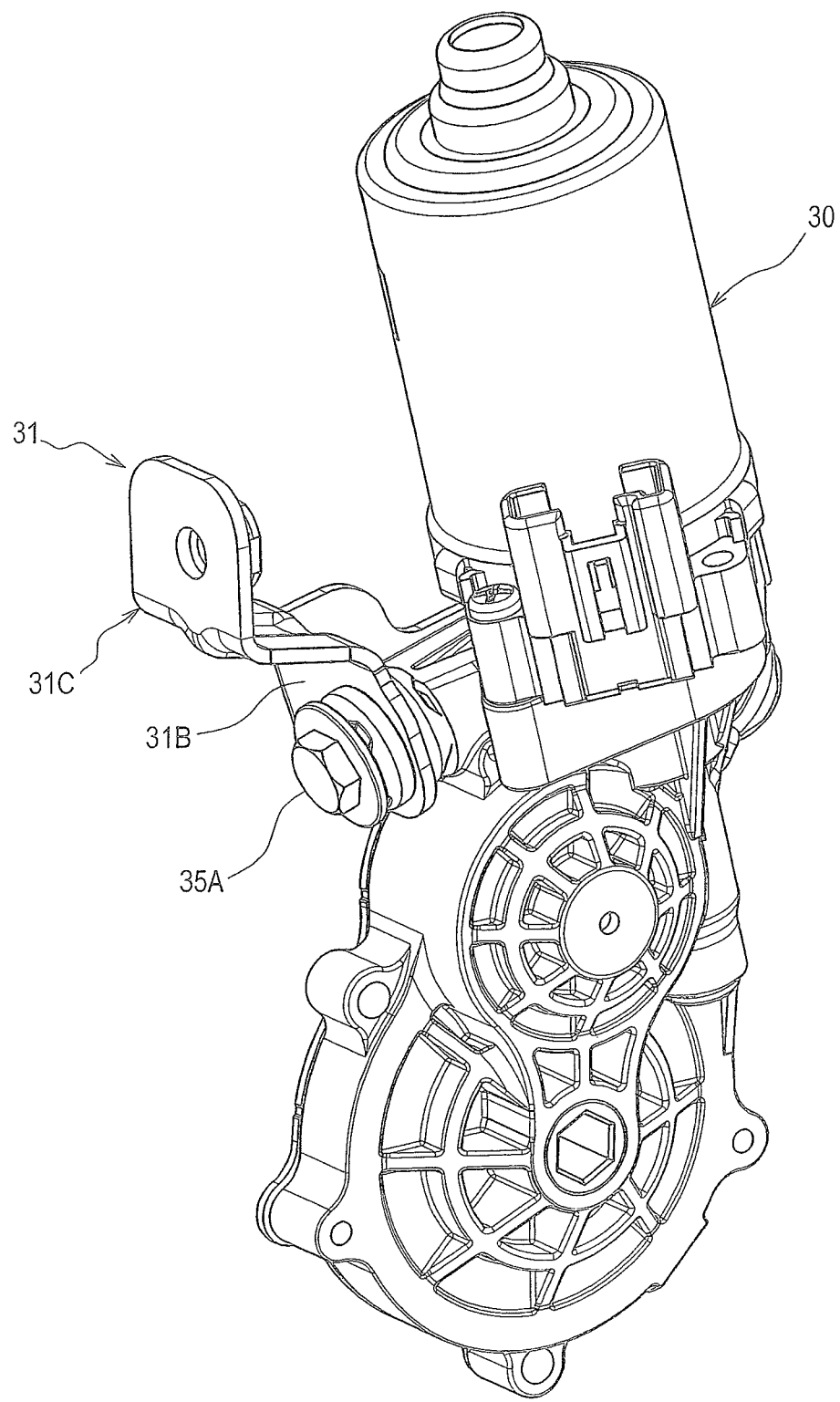
FIG. 8 is a perspective view showing the drive mechanism according to the first embodiment.

The clamping portion 31B is provided with an insertion hole 31G. The insertion hole 31G is a through-hole through which a fixing bolt 35A (see FIG. 8) can be inserted. The fixing bolt 35A penetrates a vibration proof rubber, fitted to the insertion hole 31G, and is secured to the drive mechanism 30.

The clamping portion 31A is provided with an attachment hole 31H. The attachment hole 31H is a through-hole in which an attachment portion 35B (see FIG. 6) provided to the drive mechanism 30 is fitted. The attachment hole 31H is a keyhole-like cut-out provided at the leading end of the clamping portion 31A.

The extending portion 31C extends from the clamping portion 31B toward the fixing surface 33A. As shown in FIG. 7A, the extending portion 31C comprises a plate portion 31D formed substantially in a plate shape, and a fixing surface 31F provided in the leading end side of the plate portion 31D.

The fixing surface 31F forms a plate surface intersecting with the plate portion 31D. Thus, the extending portion 31C is configured to be bent substantially in an L shape. The plate portion 31D is provided with a convex-shaped or a concave-shaped bead portion 31E.

A nut 31G, such as a weld nut, is welded to the fixing surface 31F. The fastening tool 35 is fitted in the nut 31G. The bead portion 31E is formed in a concave shape recessed in a direction away from the nut 31G.

In the present embodiment, since the rotational axis of the drive mechanism 30, that is, the rotational axis of the electric motor substantially corresponds to the up-down direction, anti-toque force around a rotational axis substantially in the up-down direction is applied to, for example, the motor bracket 31.

In the present embodiment, the anti-toque force is received by a toque transmitting rod 37 (see FIG. 2) extending in the seat width direction. The toque transmitting rod 37 is configured to transmit the reclining driving force to the first side frame portion 3 and the second side frame portion 5.

Therefore, a structure is employed in the present embodiment wherein, as shown in FIG. 6, the motor bracket 31 is secured to the fixing surface 33A with one fastening tool 35. This is because the anti-toque force does not act upon the fastening tool 35 as a force to loosen the fastening tool 35.

The force that loosens the fastening tool 35 is torque around the central axis, that is, the rotational center, of the fastening tool 35. Since the toque transmitting rod 37 penetrates the drive mechanism 30, the drive mechanism 30 cannot be rotated on the central axis, that is, the rotational center, of the fastening tool 35.

3. Feature of Conveyance Seat (Particularly Seatback Frame Structure) According to Present Embodiment In the present embodiment, the fixing surface 33A to which the drive mechanism 30 is secured intersects substantially perpendicularly with the front-rear direction of the seat.

Consequently, the first walk-in mechanism 21A is secured in the first side of the seat width direction across the first side frame portion 3, while the drive mechanism 30 is secured in the second side of the seat width direction across the first side frame portion 3 to the fixing surface 33A intersecting substantially perpendicularly with the front-rear direction of the seat.

Since the drive mechanism 30 is secured to the fixing surface 33A via the motor bracket 31, a conventional drive mechanism 30 can be secured to the fixing surface 33A by replacing the motor bracket 31.

The fixing surface 33A according to the present embodiment is located in the rear end side of the first side frame portion 3 in the front-rear direction of the seat. This structure enables the fixing surface 33A not to be placed in the back side of an occupant. Accordingly, this disposition can inhibit the fixing surface 33A from giving discomfort to an occupant in a seated position.

A plate portion 31D of the motor bracket 31 is provided with the convex-shaped or concave-shaped bead portion 31E. This structure can increase the flexural rigidity of the extending portion 31C, that is, the flexural rigidity of the motor bracket 31. Therefore, the drive mechanism 30 can be firmly secured.

The motor bracket 31 is secured to the fixing surface 33A with the fastening tool 35 inserted from the rear side of the seat. This structure enables the fastening tool 35, such as a screw, to be easily inserted and fastened.

[Other Embodiment]

In the above-described embodiment, the lateral surface portion 3A, the flange portion 3B, and the motor fixing portion 33 are integrally formed of metal. However, the present disclosure is not limited to this structure. For example, the motor fixing portion 33 may be manufactured separately from the first side frame portion 3 and integrated with the first side frame portion 3 by a fastening tool, such as a screw, or welding.

In the above-described embodiment, the motor bracket 31 is secured to the motor fixing portion 33 by the fastening tool 35 inserted from the rear side of the seat. However, the present disclosure is not limited to this structure.

That is, for example, a structure wherein the motor bracket 31 is secured to the motor fixing portion 33 by the fastening tool 35 inserted from the front side of the seat, or a structure wherein the motor bracket 31 is secured to the motor fixing portion 33 by, for example, welding or caulking may be used.

In the above-described embodiment, the bead portion 31E is provided to the plate portion 31D of the motor bracket 31. However, the present disclosure is not limited to this structure. A structure wherein the bead portion 31E is omitted, a structure wherein the bead portion 31E has a convex-shape, or the like may be used.

The fixing surface 33A according to the above-described embodiment is located in the rear end side of the first side frame portion 3 in the front-rear direction of the seat. However, the present disclosure is not limited to this structure. For example, the fixing surface 33A may be positioned in the front end side of the first side frame portion 3 in the front-rear direction of the seat.

The two side frame portions 3, 5 according to the above-described embodiment are panel-shaped members comprising the lateral surface portions 3A, 5A and the flange portions 3B, 3C, 5B, 5C. However, the present disclosure is not limited to this structure. That is, for example, two side frame portions 3, 5 may be formed with pipes in a truss structure.

The conveyance seat according to the above-described embodiment is for an automobile. However, the present disclosure is not limited to this application. The features of the present disclosure can be applied to a seat for a railroad vehicle, a seat for a ship, and a seat for an airplane.

Moreover, the present disclosure is not limited to the above-described embodiments as long as the present disclosure meets the gist of the disclosure recited in the claims. Accordingly, a structure wherein the members 6A to 6D are omitted, or a structure wherein at least two embodiments among the above-described embodiments are combined may be used.

What is claimed is:

1. A conveyance seat comprising:
a seatback configured to be pivotable in a front-rear direction of the seat with respect to a seat cushion;
a first side frame portion configured to form a framework of the seatback and disposed on a first side in a seat width direction extending substantially in an up-down direction;
a second side frame portion configured to form the framework of the seatback together with the first side frame portion and disposed on a second side in the seat width direction extending substantially in the up-down direction;
a drive mechanism configured to generate driving force so as to pivot the first side frame portion and the second side frame portion in the front-rear direction of the seat, the drive mechanism being disposed on the first side frame portion facing the second side frame portion in the seat width direction;
a motor fixing portion disposed on the first side frame portion and provided with a fixing surface on which the drive mechanism is secured; and
a bracket configured to secure the drive mechanism to the fixing surface, wherein
the fixing surface is arranged in the seat width direction so as to be substantially perpendicular to a front-rear direction of the seat.

2. The conveyance seat according to claim 1, wherein
the fixing surface is disposed on a rear-end side of the first side frame portion in the front-rear direction of the seat.

3. The conveyance seat according to claim 1, wherein
the bracket comprises two clamping portions configured to clamp the drive mechanism from both sides in the front-rear direction of the seat so as to support the drive mechanism, and an extending portion extending from either one of the two clamping portions toward the fixing surface.

4. The conveyance seat according to claim 3, wherein
the extending portion comprises a plate portion formed substantially in a plate-shape and one of a convex-shaped or a concave-shaped bead portion provided on the plate portion.

5. The conveyance seat according to claim 4, wherein
the bracket is secured to the fixing surface with a fastening tool inserted into the bracket from a rear side of the seat.

6. The conveyance seat according to claim 1, wherein
the first side frame portion comprises a first surface portion arranged in the front-rear direction so as to be substantially perpendicular to the seat width direction and a second surface portion arranged in the seat width direction so as to be substantially perpendicular to the front-rear direction of the seat, and wherein
the motor fixing portion is provided to the second surface portion.

7. The conveyance seat according to claim 1, wherein
the bracket is secured to the fixing surface via a fastener extending in a direction parallel to the front-rear direction of the seat.

\* \* \* \* \*